United States Patent
Wildschek et al.

(10) Patent No.: US 11,102,800 B2
(45) Date of Patent: Aug. 24, 2021

(54) RESERVING RESOURCES IN DEVICE TO DEVICE COMMUNICATION

(71) Applicant: Nokia Technologies OY, Espoo (FI)

(72) Inventors: Torsten Wildschek, Bristol (GB); Matthew Baker, Canterbury (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/603,425

(22) PCT Filed: Apr. 27, 2018

(86) PCT No.: PCT/EP2018/060821
§ 371 (c)(1),
(2) Date: Oct. 7, 2019

(87) PCT Pub. No.: WO2018/202559
PCT Pub. Date: Nov. 8, 2018

(65) Prior Publication Data
US 2020/0154453 A1     May 14, 2020

(30) Foreign Application Priority Data
May 5, 2017   (EP) .................................. 17169777

(51) Int. Cl.
*H04W 72/12*   (2009.01)
*H04W 72/04*   (2009.01)
*H04L 5/00*    (2006.01)
*H04L 1/00*    (2006.01)
*H04W 84/20*   (2009.01)

(52) U.S. Cl.
CPC ......... *H04W 72/121* (2013.01); *H04L 1/0003* (2013.01); *H04L 5/0082* (2013.01); *H04W 72/0453* (2013.01); *H04W 72/1247* (2013.01)

(58) Field of Classification Search
CPC ............... H04L 1/0003; H04L 5/0082; H04W 72/0453; H04W 72/121; H04W 72/1247; H04W 48/10; H04W 4/46; H04W 72/12; H04W 84/20; H04W 28/0875
See application file for complete search history.

(56) References Cited

U.S. PATENT DOCUMENTS

| | | | |
|---|---|---|---|
| 10,375,675 B2* | 8/2019 | Nguyen | H04W 4/06 |
| 10,582,553 B2* | 3/2020 | Seo | H04W 72/1278 |
| 2017/0034688 A1* | 2/2017 | Kim | G01S 5/26 |

(Continued)

FOREIGN PATENT DOCUMENTS

| | | |
|---|---|---|
| WO | WO-2017/027355 A1 | 2/2017 |
| WO | WO-2017/052458 A1 | 3/2017 |

OTHER PUBLICATIONS

International Search Report PCT/ISA/210 for International Application No. PCT/EP2018/060281 dated Jun. 29, 2018.

(Continued)

*Primary Examiner* — Ahmed Elallam
(74) *Attorney, Agent, or Firm* — Harness, Dickey & Pierce, P.L.C.

(57) ABSTRACT

The method includes determining a time interval during which at least one other user equipment is to transmit a data transmission; generating a scheduling signal indicative of the data transmission; and transmitting the scheduling signal during the determined time interval.

14 Claims, 3 Drawing Sheets

(56) References Cited

U.S. PATENT DOCUMENTS

| | | | | |
|---|---|---|---|---|
| 2019/0124653 A1* | 4/2019 | Chae | .................... | H04W 72/02 |
| 2020/0015176 A1* | 1/2020 | Li | ........................ | H04L 5/0082 |
| 2020/0053675 A1* | 2/2020 | Khoryaev | ............. | H04W 56/00 |
| 2020/0107351 A1* | 4/2020 | Lee | ....................... | H04L 5/0082 |
| 2020/0236666 A1* | 7/2020 | Yu | ..................... | H04W 72/0446 |
| 2020/0275458 A1* | 8/2020 | Khoryaev | ............. | H04W 76/14 |

OTHER PUBLICATIONS

Written Opinion of the International Searching Authority PCT/ISA/237 for International Application No. PCT/EP2018/060281 dated Jun. 29, 2018.

CATT "Discussion on shorten TTI in V2X phase 2" 3GPP TSG RAN WG1 Meeting #88bis, Spokane Washington USA, Apr. 3-7, 2017.

Intel Corporation "Consideration on Support of Short TTI for LTE V2V Sidelink Communication" 3GPP TSG RAN1 WG Meeting #88bis, Spokane Washington USA, Apr. 3-7, 2017.

Xinwei "Discussion on PC5-based V2X with Short TTI" 3GPP TSG-RAN WG1 Meeting #88bis, Spokane Washington USA, Apr. 3-7, 2017.

* cited by examiner

RESERVING RESOURCES IN DEVICE TO DEVICE COMMUNICATION

CROSS-REFERENCE TO RELATED APPLICATIONS

This application is a national phase under 35 U.S.C. § 371 of PCT International Application No. PCT/EP2018/060821, which has an international filing date Apr. 27, 2018, which claims priority to European Application 17169777.4, filed May 5, 2017, the entire contents of each of which are hereby incorporated by reference.

FIELD OF THE INVENTION

The invention relates to the field of wireless communication and in particular, to the scheduling and reservation of resources in direct device to device communication.

BACKGROUND

Device to device (D2D) communication is useful in situations where there is no radio cell coverage and in situations where low latency communication is required. One such situation is vehicle to vehicle transmissions V2X where autonomous drive vehicles transmit information between themselves regarding the vehicle operation to allow the vehicles to travel close together as a group or platoon without colliding.

In order to reduce the latency of these communications shorter TTI (transmit time intervals) are proposed. However, a potential problem with changing transmission properties, such as reducing TTIs, in circumstances where other legacy user equipment are also operational is that these legacy user equipment may not be able to interpret the signals. This can be problematic in circumstances such as direct device to device communication where sensing—SA (scheduling assignment, also known as PSCCH or sidelink control information) decoding and energy measurements—is used to determine when there is resource available for transmission. This sensing that is used to avoid data collision in D2D communications may not function correctly if the scheduling assignment (SA) signal used to indicate that a particular resource is being used is of a form that cannot be interpreted by legacy user equipment. If legacy user equipment cannot correctly interpret such signals then collision between legacy user equipment and user equipment using different transmission properties such as shorter TTIs will increase.

"Discussion on PC5-based V2X with Short TTI" RI-1705166, 3GPP TSG RAN WG1 Meeting 88bis, Spokane USA, 3-7 Apr. 2017 discloses vehicle related communication where collision between communications is reduced by using shortened transmit time intervals (TTI).

WO2017/052458 discloses device to device (D2D) communication, in which resource sets for transmitting the D2D data are determined and used for the D2D transmissions.

WO2017/052458 discloses a method of indicating resources in periodically occurring resource pools for transmitting data messages between devices. The method comprises transmitting a scheduling assignment message to indicate the resources.

It would be desirable if the latency of sidelink communications could be reduced without unduly increasing collisions with legacy UEs.

SUMMARY

A first aspect of the present invention provides a method of direct device to device communication performed at a user equipment comprising: determining a time interval during which at least one other user equipment is to transmit a data transmission; generating a scheduling signal indicative of said data transmission; and transmitting said scheduling signal during said determined time interval. In systems where data collision may occur and are reduced by using sensing, the scheduling signal indicating data transmission to other user equipment is transmitted by the user equipment that also transmits the data. However, the inventors recognised that this does not have to be the case. The important thing is that the signal that allows other user equipment to be aware of the data transmission is available for detection. They also recognised that in some circumstances it might be desirable to separate the functions of data transmission and scheduling signal transmission as this might alleviate some of the constraints that the requirement for legacy user equipment to interpret the scheduling signals introduces. The data transmissions do not have to be decoded by legacy user equipment and as such there are fewer constraints on these signals and a greater freedom in the choice of their transmission parameters and properties. Separating the two transmissions allows parameters to be selected for the data transmissions that are different to those of the scheduling signal providing more flexibility in the choice of transmission parameters for the data signals while still confining the scheduling signal to parameters that allow it to be received and interpreted by legacy user equipment.

In some embodiments, said step of transmitting comprises transmitting said scheduling signal during a scheduling signal time interval, said scheduling signal time interval being longer than said determined time interval.

The separation of transmission of the scheduling signal from that of data transmission allows the scheduling signal to be transmitted during a longer time interval than the data transmission. In this regard, where it is desirable to reduce the transmission time interval in order to reduce latency then where legacy user equipment are present and need to interpret the scheduling signal to reduce collisions, transmitting the scheduling signal at the same time as the data transmission in the shorter time intervals can cause problems. However, where the scheduling signal is transmitted by one user equipment and the data transmission by a further user equipment, then the time interval used to transmit the data transmission can be shorter than that of the scheduling signal allowing a low latency associated with a shorter transmit time interval for data to be achieved while still allowing legacy user equipment to interpret the scheduling signal.

In some embodiments, the method further comprises transmitting a data transmission during a portion of said scheduling signal time interval.

In some cases, the user equipment transmitting the scheduling signal may itself transmit data and this data transmission will be during a portion of the scheduling signal time interval. The scheduling signal in the longer time interval can cover more than one data transmission. The multiple data transmissions may include a data transmission from the user equipment transmitting the scheduling signal and/or data transmission(s) from one or more other user equipment. As the scheduling signal and data transmission are no longer tied to the same user equipment, then the scheduling signal may be concurrent with data transmitted by several user equipment. This again increases flexibility.

As noted above in some embodiments, said scheduling signal is indicative of a plurality of data transmissions from a plurality of user equipment, said transmitting step being performed at a same time as said plurality of user equipment are transmitting said plurality of data transmissions.

In some embodiments, said step of determining said time interval comprises allocating time intervals for said at least one other user equipment to transmit said data transmission in and transmitting an indication of said time interval to said at least one other user equipment.

The step of determining the time interval during which at least one other user equipment is to transmit a data transmission can be performed in a number of ways. In some embodiments, this determining is performed by receipt of a signal from a further user equipment, the signal indicating the allocation of time intervals for transmitting data to the different user equipment which are communicating together. This further user equipment is one of the at least one user equipment communicating together. In other embodiments, the user equipment determines the time interval from received higher layer signalling that indicates a predetermined schedule of transmission times for the different user equipment, while in still further embodiments said step of determining said time interval comprises allocating time intervals for said at least one other user equipment to transmit said data transmission in and transmitting an indication of said time interval(s) to said at least one other user equipment.

In some embodiments, said scheduling signal comprises scheduling information indicative of at least one of: a modulation and/or coding scheme, a priority of said at least one other user equipment or a highest priority of multiple user equipment where said at least one user equipment comprises multiple user equipment, a frequency resource of said at least one user equipment, an aggregated frequency resource of said at least one user equipment where said at least one user equipment comprises a plurality of user equipment, a time gap between retransmission of said data transmission, a duration of said data transmission, presence of further scheduling information transmitted by said at least one other user equipment at a same time as said data transmission and a location within a scheduling signal time interval of said data transmission of said at least one other user equipment.

The scheduling signal may comprise scheduling information that may be a number of things as set out above. Alternatively, it may simply be a signal whose energy level is assessed by other user equipment and from this they determine whether or not resources are currently available for transmission or not.

Where there are data transmissions from several user equipment being performed during the time interval that the scheduling signal is transmitted, then the scheduling information comprising the priority of the signal will indicate the highest priority data transmission.

In some embodiments, said scheduling signal comprises information indicative of said presence of further scheduling information and an indication that said further scheduling information comprises information overriding or complementing said scheduling information, said indication indicating which portions of said scheduling information are overridden or complemented by said further scheduling information.

The scheduling signal information may comprise information indicative of the presence of further scheduling information. In this regard, the scheduling information that is transmitted and accessible to legacy user equipment is constrained by the signalling devised for this legacy equipment. Although there are some spare reserved bits within this signalling which can be allocated to indicate certain things, there may be circumstances where there are not sufficient bits available to indicate the different possibilities provided by the new scheme. This is addressed in some embodiments by providing further scheduling information and this further scheduling information is transmitted by the user equipment that is transmitting the data. This further scheduling information is decodable by user equipment operable to receive the data transmission and can provide information that overrides and/or compliments the scheduling information that is provided in a legacy friendly manner. As this further scheduling information is only required by the user equipment configured to receive the data transmissions this further scheduling information can be transmitted in the same time interval as the data.

In some embodiments, said further scheduling information is transmitted using a frequency resource derived from the frequency resource used for transmitting said scheduling signal.

The user equipment(s) receiving the data transmission will determine from an indicator in the scheduling signal that there is further scheduling information and it will derive the frequency resource that this can be located on from the frequency resource of the scheduling signal. Often these two sets of scheduling information will be transmitted in adjacent frequency bands.

In some embodiments, said user equipment is configured to transmit scheduling signals related to its own data transmissions at a first power level and said transmitting step transmits said scheduling signal with a power that is boosted when compared to said first power level.

Since path loss between the user equipment transmitting the scheduling signal and the receiver user equipment may be higher than were the user equipment transmitting the data to transmit this signal, then in some cases it may be advantageous to boost the power of this signal as it is important that the user equipment can receive and decode the signal.

In some embodiments, said user equipment is within a group of user equipment, said group comprising said user equipment and said at least one other user equipment, said transmitting step comprising multicasting or broadcasting data to said user equipment within said group.

Embodiments of the invention are particularly applicable to groups of user equipment that multicast data between them. In such a case, one of the group may transmit the scheduling signal in such a way that the other user equipment in the group can receive the signal as well as legacy user equipment. In this way, the constraints associated with allowing legacy user equipment to interpret the scheduling signals such as using legacy time transmit intervals are removed for the data and the data can be transmitted in shorter transit time intervals while the scheduling signal can be transmitted in a longer one. It should be noted that the user equipment that transmits the scheduling signal will experience some of the disadvantages associated with transmitting this signal in a form that legacy user equipment can interpret, for example, where it is within a longer time interval then there is a longer time interval during which the user equipment can itself not receive data from other devices.

In some embodiments, said user equipment is a vehicle user equipment operable to multicast data regarding operation of said vehicle, said user equipment being within a group of vehicle user equipment.

Embodiments are particularly useful for vehicles and in particular for self-drive vehicles where low latency multicasting of the data regarding operation of the vehicle between vehicles is important to allow the vehicles to travel close to each other without colliding. Thus, embodiments are particularly applicable to such a scenario where a shorter transmit time can be used to reduce latency while collision with legacy user equipment signals can be avoided or at least reduced by using scheduling signals transmitted over conventional longer time intervals.

In some embodiments, said group comprises a platoon and said user equipment comprises a user equipment at one end of said platoon, said step of transmitting said scheduling signal comprising transmitting said scheduling signal for data transmissions in a direction away from said user equipment for other user equipment in said platoon.

Some groups of user equipment in the vehicle field form platoons, user equipment on each vehicle being a member of the platoon. As the vehicles travel in a line there will be a user equipment at the head of the platoon and one at the end of the platoon. It may be advantageous if the user equipment designated as the scheduling signal user equipment within the group is at one end of the platoon. In particular, it may be advantageous if the user equipment at one end of the platoon generates and transmits scheduling signals for data transmissions from itself and from other user equipment destined for user equipment located in a direction away from that user equipment while the user equipment at the other end of the platoon may generate and transmit scheduling signals for data transmissions destined for user equipment located in a direction away from that end of the platoon. In this way, the user equipment that is least likely to need to receive the messages that it is sending scheduling signals for is selected.

In some embodiments, said device to device communication comprises device to multiple device communication, each data transmission being multicast or broadcast to a plurality of said user equipment within said group.

In some embodiments, the method comprises an initial step of determining that said user equipment is within a group of user equipment and that said user equipment is currently a schedule signal user equipment operable to transmit said scheduling signal for at least some data transmissions of said group.

In some embodiments, the method comprises following determining that said user equipment is no longer said schedule signal user equipment; transmitting said data transmission during a transmit time interval in which a further user equipment is transmitting said scheduling signal.

User equipment within a group may be configured to either be the schedule signal user equipment for at least some data transmissions or not and this designation may change depending on circumstances. In some cases, the user equipment performs a step of determining whether it is currently the schedule signal user equipment or not. Where it is, it will generate and transmit the scheduling signal and where it is not, it will determine when it should transmit data which is when the scheduling signal is transmitted by a different user equipment. In this regard, the user equipment may receive a signal indicating when it should be transmitting the data transmission and this indication will indicate a transmit time which is a time during which a scheduling signal will be transmitted by another user equipment.

A further technique provides a method of direct device to device communication performed at a user equipment, said method comprising: determining that said user equipment is within a group of user equipment operable to perform device to device communication and that a further user equipment in said group is operable to generate and transmit a scheduling signal indicative of a data transmission transmitted by said user equipment; transmitting said data transmission during a transmit time interval in which said further user equipment is transmitting said scheduling signal.

In some cases, the method further comprises transmitting scheduling information in addition to scheduling information transmitted in said scheduling signal during said data transmission transmit time interval.

In some cases, said further scheduling information is transmitted using a frequency resource derived from the frequency resource used for transmitting said scheduling signal.

A second aspect provides a computer program which when executed by a computer is operable to control said computer to perform steps in a method according to a first aspect of the present invention.

A third aspect provides a user equipment configured to perform device to device communication, said user equipment comprising: control circuitry operable to determine that said user equipment is within a group of user equipment operable to perform device to device communication and that a further user equipment in said group is operable to generate and transmit a scheduling signal indicative of a data transmission transmitted by said user equipment; transmitting circuitry operable to transmit said data transmission during a transmit time interval in which said further user equipment is transmitting said scheduling signal.

In some embodiments, said transmission circuitry is operable to transmit said scheduling signal during a scheduling signal time interval, said scheduling signal time interval being longer than said determined time interval.

In some embodiments, said user equipment is configured to transmit scheduling signals related only to its own data transmissions at a first power level and to transmit said scheduling signal with a power that is boosted when compared to said first power level.

In some embodiments, said user equipment is operable to transmit data in a data transmission during a portion of said scheduling signal time interval.

In some embodiments, said user equipment is within a group of user equipment, said group comprising said user equipment and said at least one other user equipment, said transmitting circuitry being operable to multicast or broadcast data to said user equipment within said group.

In some embodiments, said user equipment is a vehicle user equipment operable to multicast or broadcast data regarding operation of said vehicle, said user equipment being within a group of vehicle user equipment.

In some embodiments, said group comprises a platoon and said user equipment comprising a user equipment at one end of said platoon, said user equipment being operable to transmit said scheduling signal for data transmissions in a direction away from said user equipment for other user equipment in said platoon.

In some embodiments, said device to device communication comprises device to multiple device communication, each data transmission being broadcast or multicast to a plurality of said user equipment within said group.

In some embodiments, said control circuitry is operable to determine whether said user equipment is currently a schedule signal user equipment of said group or not and to generate and transmit said scheduling signal in response to determining that said user equipment is currently said schedule signal user.

In some embodiments, said user equipment is configured to transmit further scheduling information in addition to scheduling information transmitted by said scheduling signal during said data transmission transmit time interval.

A fifth aspect provides a user equipment operable to perform direct device to device communication, said user equipment comprising: control circuitry operable to determine that said user equipment is within a group of user equipment operable to perform device to device communication and that a further user equipment in said group is operable to generate and transmit a scheduling signal indicative of a data transmission transmitted by said user equipment; transmitting circuitry operable to transmit said data transmission during a transmit time interval in which said further user equipment is transmitting said scheduling signal.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
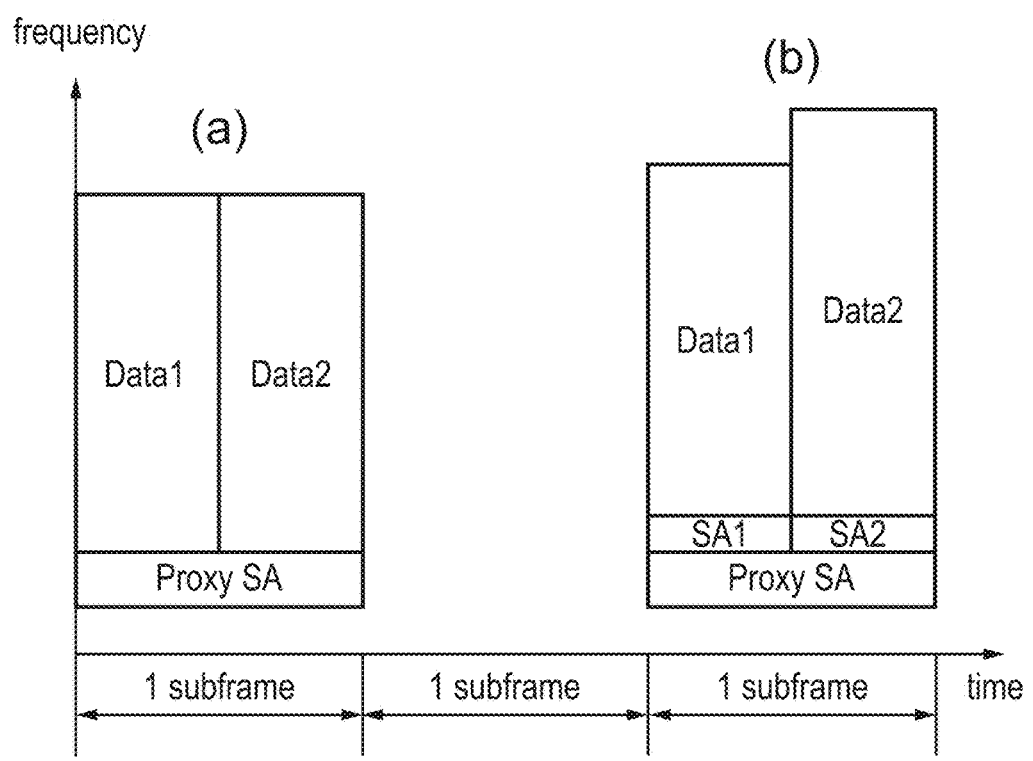
FIG. 1 illustrates the transmission of scheduling signals and data according to two different embodiments.

Before discussing the embodiments in any more detail, first an overview will be provided.

The present application is concerned with reducing latency of direct communication between user equipment and in particular in reducing latency in sidelink communications between user equipment within a group of user equipment. In embodiments this is done by reducing the transmission time interval TTI for such transmissions. However, in order for legacy user equipment to be able to detect that such reduced time interval transmissions are occurring and thereby avoid or at least reduce collisions, the scheduling assignment signals which indicate to other user equipment that transmissions are occurring are transmitted across a longer time interval. This is achieved by allowing a user equipment other than the one transmitting the data to transmit the scheduling assignment signal. Thus, one user equipment the scheduling signal or proxy user equipment may transmit the scheduling assignment signal for multiple user equipment.

In some cases, the scheduling assignment may be transmitted over a longer transmit time interval corresponding to the legacy transmit time interval and comprising a plurality of data transmission transmit time intervals. During this longer transmit time interval a plurality of data transmissions may be transmitted, and where the scheduling assignment signal includes control information relating to the data transmissions then this control information relates to all of the data transmissions.

Thus, the technique provides the benefit of short TTI data transmission while accommodating the constraints associated with coexistence with legacy UEs in the same resource pool configured with sensing-based resource selection.

Sidelink transmission (that is transmission between user equipment) with short TTI can have several potential benefits, such as reducing latency (delay between the time when the higher layer submits a message for transmission and the time the message can be transmitted by the physical layer) and mitigating the half-duplex issue (a typical UE cannot transmit and receive on sidelink at the same time, so during the time span of its own transmissions it may miss transmissions from other UEs).

A problem arises if UEs configured to use short TTI transmissions have to coexist in the same resource pool with legacy UEs that do not support short TTI, this is particularly so if that resource pool is configured such that UEs use sensing—SA (scheduling assignment, also known as PSCCH or sidelink control information) decoding and energy measurements—for resource selection.

If a UE using short TTI transmission applies the short TTI to its transmissions of both data and SA, then the SA transmitted using short TTI cannot be decoded by legacy UEs (which by definition do not support short TTI), hence sensing will not work as designed, resulting in a higher rate of collisions. If on the other hand the UE using short TTI transmissions applies short TTI only to its data transmissions, while applying the normal TTI (1 subframe of length 1 ms) to its SA transmissions then the SA can be decoded by legacy UEs, however the benefits of using short TTI will be reduced; e.g. because the UE's SA transmission will last for a normal TTI the UE will be unable to receive for the duration of a normal TTI, hence the benefit of mitigating the half-duplex issue will be lost.

A second problem is resource fragmentation in the time domain when legacy UEs using sensing-based resource selection coexist with short TTI transmissions in the same resource pool:

For brevity, in the following text those UEs according to embodiments which do support transmission and reception using short TTI will be referred to as "R15" or embodiment UEs, while UEs which do not support short TTI will be called legacy or "R14" UEs.

It is preferable if legacy UEs avoid colliding with UEs using short TTI transmission. Without loss of generality, let us consider the case of 2 UEs performing short TTI transmission of TTI=1 slot (compared to normal TTI transmission of TTI=1 subframe=2 slots) and utilizing all the resources in the frequency domain: If these 2 UEs perform their transmission in different subframes then two subframes are completely "lost" to R14 UEs; if on the other hand it was possible to let these 2 UEs transmit in adjacent time slots in the same subframe then only one subframe would be lost to R14 UEs.

A third problem is related to the energy measurement aspect of sensing-based resource selection by R14 UEs:

If short TTI transmissions occupy only a fraction of the time in a subframe, then an R14 UE, based on measuring energy averaged over the whole duration of the subframe, may come to the conclusion that the resources are occupied with low energy and hence it is acceptable to collide with them. This problem is closely related to the second problem outlined above.

A fourth problem is that if only a fraction of the time span of a subframe is occupied by short TTI transmissions then R14 UEs will experience strong variations in receive power, which may cause problems for their automatic gain control (AGC) and result in increased quantization and clipping noise.

The above problems are addressed by embodiments, that provide separation between the transmission of scheduling signals and data transmissions, allowing the data transmission to be transmitted with properties that do not need to be those of legacy UEs as the data transmissions do not need to be interpreted by these UEs. In particular embodiments, allow longer TTIs for transmitting scheduling signals, with shorter TTIs for data transmissions. Thus, the latency of the data transmissions are reduced and the problems with the half duplex nature of the signals restricting UEs ability to receive signals when transmitting are mitigated for the UEs not transmitting the scheduling signals.

In one example, a R 15 UE according to an embodiment is provided which has some degree of control over a set of other R15 UEs. A typical use case is platooning, where there is a designated platoon leader, tasked with managing the platoon. The members of the set of R15 UEs all transmit messages of the same size, and at the same rate, and using the same modulation and coding scheme (MCS). Again, this is typically the case in the platooning use case; e.g. the message rate will depend on platoon characteristics such as the platoon's current velocity and target inter-vehicle distance.

It should be noted that this specific scenario is defined here because it simplifies description of the basic idea; the invention, however, is not limited to this specific scenario, generalizations will be discussed as appropriate.

The basic idea is that the SA (or at least not all of the SA) does not have to be transmitted by the same UE as the corresponding data. Such an SA transmission by one UE on behalf of another UE will be termed "proxy SA", the UE transmitting proxy SAs will be called "SA proxy" and the UE on whose behalf the proxy SA is transmitted will be called "SA-proxied UE" in the following description.

In the illustrative scenario, the SA (or at least part of the SA) for some or all of the UEs in the set of UEs according to an embodiment or the R15 UE set (the SA-proxied UEs) can be transmitted by the "controlling UE" acting as SA proxy. This of course requires the SA proxy to have sufficient knowledge about the data transmissions of these SA-proxied UEs such that it can populate the information fields in the proxy SA transmissions. If the SA proxy does not have sufficient knowledge about a parameter of the data transmissions of an SA-proxied UE, such a parameter can still be further indicated by the SA-proxied UE (in a transmission of additional SA information by the SA-proxied UE, see details below re. additional sTTI SA).

The proxy SA transmission will be transmitted using a conventional TTI, while the associated data transmissions will use shorter TTI. The proxy SA will use the conventional R14 format (SCI format 1). In some embodiments the proxy SA will use some of the reserved bits within that format.

A single proxy SA transmission can schedule one or more short-TTI data transmissions by one or more SA-proxied UEs; these data transmissions will all take place in the same transmit time interval as the associated proxy SA transmission. In some embodiments the SA transmit time interval is a subframe.

In the following embodiment, the SA-proxied UEs will transmit for only the short TTI duration within a subframe and hence can receive other R15 UEs' transmissions in the remaining parts of the same subframe, thus enjoying the benefit of reduced impact of the half-duplex issue. The proxy SA transmission on the other hand will use normal TTI and reuse the R14 format, hence can be decoded by R14 UEs. R14 or legacy UEs can hence use sensing based on SA decoding to avoid or at least reduce collisions with the short TTI data transmissions. As a result, the problem of reducing latency without increasing collisions is mitigated.

Further, if the timing of the SA-proxied UEs' data transmissions can be controlled centrally by the SA proxy or in a cooperative fashion among SA-proxied UEs and SA proxy then the severity of the issue of the, resource fragmentation in the time domain problem, can also be reduced by scheduling multiple UEs' data transmissions in the same subframe (s). Preferably, these multiple UEs scheduled for data transmission in the same subframe are in close proximity to each other, resulting in similar path loss to conventional R14 UEs performing energy measurement. In addition, this helps to mitigate other problems outlined in the introduction, particularly if the full time span of the longer SA transmit interval, in some embodiments a subframe, can be occupied by short TTI transmissions.

Signaling Design

Contents of proxy SA:

The design considerations are:
  R14 or legacy UEs are able to decode the proxy SA and use its contents for sensing-based resource selection;
  R15 or embodiment UEs are in addition able to extract information relevant to receiving and decoding the associated short-TTI data transmission(s).

The contents of the legacy SCI format 1 are defined in 3GPP TS 36.212 section 5.4.3.1.2 (03-2017). Other standards that are relevant to this technique are 3GPP TS 36.213 (03-2017) and, in particular section 14 UE procedures related to Sidelink, sections 14.2.1.3 UE procedure for PSCCH power control and 14.1.1.5 UE procedure for PSSCH. All of these sections are incorporated by reference into this application.

In this section we will discuss the information fields of the legacy SCI format 1 one by one, by way of example:

Priority (PPPP) Field:

In many cases, all the data transmissions scheduled by a single proxy SA will have the same priority, so this field will simply be populated with that priority. If on the other hand there is more than one priority present among these data transmissions then the SA proxy will populate this field with the highest priority (lowest PPPP value) among all the data transmissions associated with this proxy SA transmission; the rationale is that the sensing-based resource selection decisions by R14 UEs will take this field into account and prefer, ceteris paribus, to collide with low priority transmissions.

Resource Reservation Field:

In this illustrative scenario all data transmissions have the same period, hence the same value for this field.

Frequency Resource Location of Initial Transmission and Retransmission Field:

This is set to the envelope of all associated data transmissions (that is the smallest R14-compatible allocation that includes all the resources used for short TTI data transmissions).

Time Gap Between Initial Transmission and Retransmission Field:

Assumed to be the same for all associated data transmissions, hence set to that value.

Modulation and Coding Scheme Field:
Assumed to be the same for all associated data transmissions, hence set to that MCS value.
Retransmission Index:
Assumed to be the same for all associated data transmissions, hence set to that value.
Reserved Information Bits:
There are at least 7 and at most 15 reserved information bits available in SCI format 1, depending on the number of subchannels in the resource pool. Some of these spare bits can be used to provide the additional information needed by R15 UEs to receive and decode the one or more associated data transmissions.

For an R15 UE to receive and decode the short TTI transmissions associated with a proxy SA, the following information may be needed in addition to the information in the legacy SCI format 1:

Duration of Short TTI

It may not be necessary to explicitly signal this: The 3GPP specification may provide for only a single V2X sidelink short TTI duration, e.g. short TTI=1 slot, eliminating the need for this parameter. Alternatively, if the specification allows multiple values for short TTI duration, then a single common short TTI duration may be negotiated during establishment of the proxying association between SA proxy and SA-proxied UEs with higher level signalling.

Which of the sTTI Locations within the Subframe are Occupied

This could be explicitly signaled by a bitmap, of length equal to the number of short TTI occasions within a subframe (e.g. 2 bits if the short TTI's duration is equal to 1 slot). Alternatively, R15 UEs can blindly try to receive data for each short TTI occasion within the current subframe.

If the associated data transmissions do not all occupy the same resources in the frequency domain: Frequency resource location of individual data transmissions. This is not needed if all associated data transmissions occupy the same resources in the frequency domain within the current subframe. Otherwise the delta between the frequency resource location indicated in the legacy part of SCI format 1 and the individual short TTI data transmissions can be signaled for each associated data transmission in the current subframe.

If the associated data transmissions do not all use the same MCS: MCS of individual data transmissions can be signalled If any or all of the above parameters need to be explicitly signaled then the following alternatives are provided in different embodiments:
1. Signaling in the reserved information bits of the SCI format 1;
2. If the number of bits in alternative 1 is not sufficient, then an additional non-proxied SA transmission is introduced; that is, each SA-proxied UE transmits an additional short TTI SA containing the information needed to receive and decode the associated data transmissions. This additional SA is transmitted at the same time as associated data transmission and on frequency resources which can be derived from the frequency location of the associated proxy SA. They may for example be adjacent to it.
3. A combination of the above is also possible, e.g. a flag in the reserved bits of the proxy SA could indicate if additional non-proxied SAs are sent in the current subframe.

If an additional sTTI SA is transmitted by an SA-proxied UE, it would also be possible for it to contain fields which override or complement those of the proxy SA. For example, if the MCS of the sTTI data transmission were different from that signalled in the proxy SA, the sTTI SA could signal a different MCS which would override the MCS indicated in the proxy SA. In order to keep the size of the sTTI SA small, a field in the sTTI SA could indicate which override or complementary fields are included—for example, a 3-bit field would enable one of the 6 non-reserved fields listed above to be indicated, while a 4-bit field would enable two of the 6 non-reserved fields to be indicated; if the value 100 indicates MCS, then an sTTI SA including the value 100 would then contain an MCS field to override the MCS indicated in the proxy SA.

FIG. 1a illustrates the case where all required signaling information is contained in the proxy SA. FIG. 1b shows the case where an additional sTTI SA is transmitted by each SA-proxied UE. Although the frequency band in which the signals are transmitted can be different depending on the field and area, in some cases it is between 5 and 9 GHz.

In FIG. 1a, two different proxied user equipment transmit data1 and data 2 during sTTIs while the proxy user equipment transmits the SA. The frequency resource used to transmit the data and SA is within a frequency bandwidth assigned for such communications and monitored by the user equipment within the group. In some embodiments this frequency bandwidth comprises 5-9 GHZ. The user equipment monitors for the SA and data at the relevant times and in the relevant frequency resources and uses the retrieved SA information to help in decoding the data. In some cases one of data1 or data2 will be transmitted by the proxy UE.

In FIG. 1b, there is further scheduling information required for decoding the data transmissions and this will be indicated in the proxy SA which will allow the user equipment to determine where to monitor for the additional SA and allows them to decode the data. The data is output in an increased width frequency band but within the frequency band allocated for these transmissions and monitored by the user equipment.

Since the SA proxy can only usefully schedule sTTI transmissions that it is not expected to receive itself (due to the half-duplex issue), embodiments are particularly advantageous where a series of messages is passed linearly along a sequence of UEs. For example, in a platoon, the platoon head at one end of the platoon may act as the SA proxy for all sTTI transmissions in the downward direction through the platoon (i.e. away from the platoon head), while a platoon tail at the opposite end of the platoon might also act as the SA proxy for all sTTI transmissions in the upward direction through the platoon.

Figure 2:
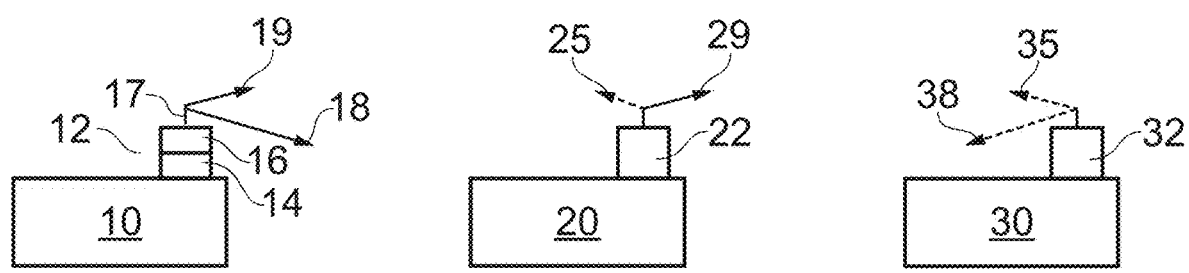
FIG. 2 schematically shows a platoon of user equipment.

FIG. 2 shows an example of user equipment within a platoon of vehicles with the signals transmitted by the different user equipment shown. In this embodiment only three vehicles are shown for ease of illustration although it would be clear to the skilled person that many more could be present within the platoon.

Figure 3:
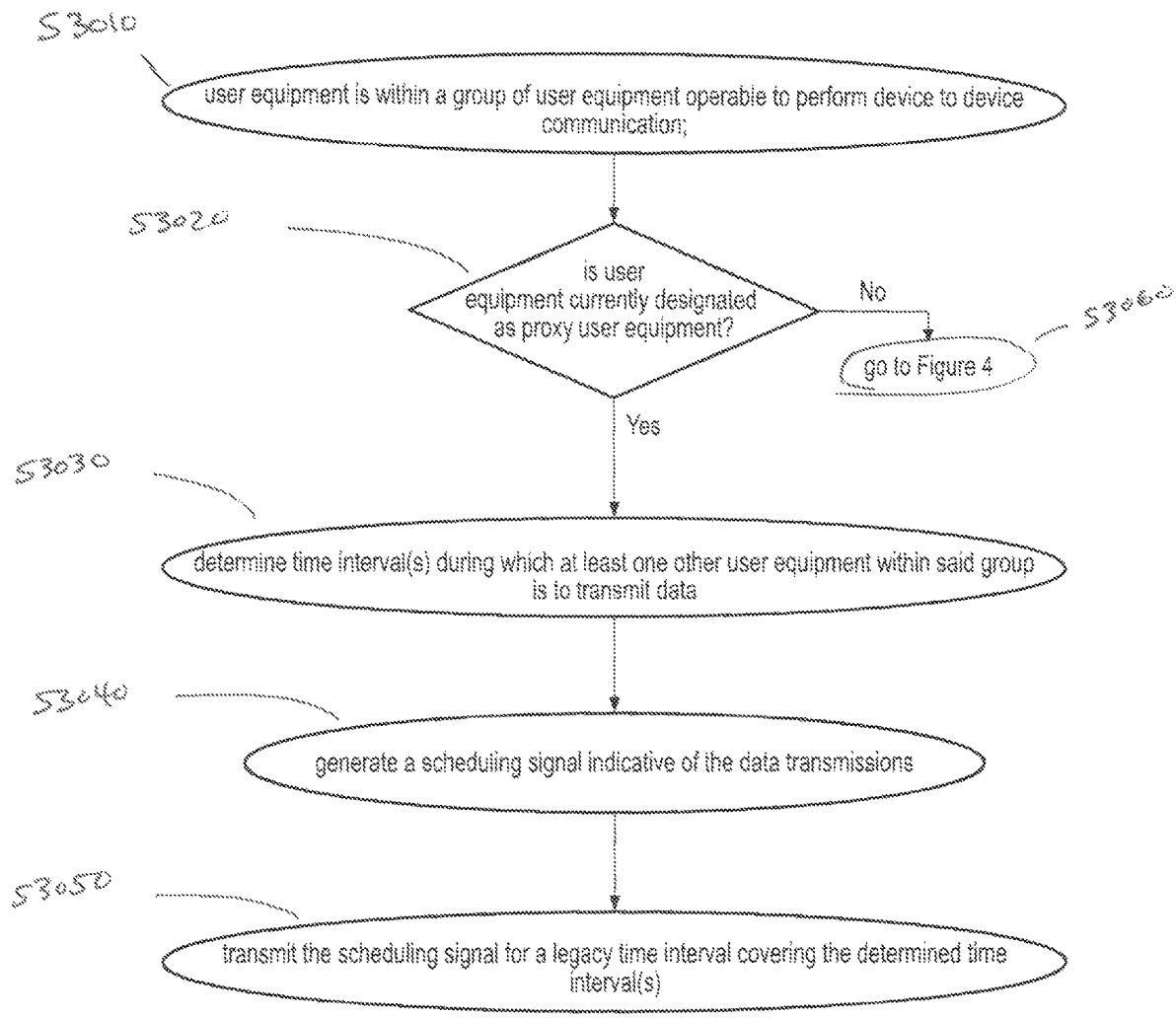
FIG. 3 schematically shows a method performed at a user equipment configured as a scheduling signal transmitting user equipment.

In FIG. 3 head vehicle 10 comprises a user equipment 12 having control circuitry 14 for determining time intervals and generating scheduling signals and transmission circuitry 16 for transmitting the signals via aerial 17.

In this embodiment user equipment 12 is the proxy user equipment for signals transmitted towards the rear of the platoon and thus generates a scheduling signal 18 which is transmitted with a high power, and in this embodiment it also generates and transmits a data transmission 19. The intermediate vehicles in the platoon, shown here as 20, also transmit data transmissions 29 towards the rear of the platoon. They do so in the same time interval that the scheduling signal 18 is transmitted by proxy UE 10. The user equipment 32 on the vehicle 30 at the rear of the platoon receives data transmissions form the other user equipment but is also the proxy user equipment for data transmissions for user equipment in the forward direction. Thus, it transmits a high power scheduling signal 38, along with a data transmission 35. The intermediate user equipment (s) 20 also transmit data signals 25 for user equipment ahead of it and it does these at the same time as user equipment 32 is transmitting the scheduling signal 38.

Thus, in this embodiment there are two proxy user equipment one acting as proxy where user equipment are sending data transmissions destined for user equipment in one direction and one acting as proxy where user equipment are sending data transmissions destined for user equipment in the opposite direction.

PSCCH Transmit Power of Proxy SA

The power of the proxy SA transmission may need to be boosted compared to the power that would conventionally be used for transmitting SA signals, since path loss between the SA proxy (transmitting PSCCH of proxy SA) and receiver UE may be higher than between SA-proxied UE (transmitting PSSCH) and receiver UE, and reception of PSCCH is critical to decoding PSSCH. This is the case in the example of FIG. 2.

FIG. 3 shows a flow diagram illustrating steps in a method performed according to an embodiment.

Initially it is determined if the user equipment is to perform device to device communication (S3010). It is then determined if the user equipment is currently designated as a proxy user equipment (S3020). In this regard this may be for all communications in the group of user equipment, or it may be in relation to a subset of data transmissions such as those in one direction (as in FIG. 2). If it determines that it is currently a proxy user equipment, then it determines the time interval during which other user equipment within the group are to transmit data for which it is a proxy (S3030). This may be determined from higher layer signaling, or the user equipment may itself designate the time intervals and indicate them to the user equipment via higher layer signaling.

A scheduling signal indicative of the data transmission(s) to be performed is then generated (S3040) and transmitted in a legacy time interval such that conventional user equipment can interpret it (S3050). This time interval is concurrent with the time interval of the data transmissions to which it relates, such that it provides the required scheduling signals for the other user equipment.

Figure 4:
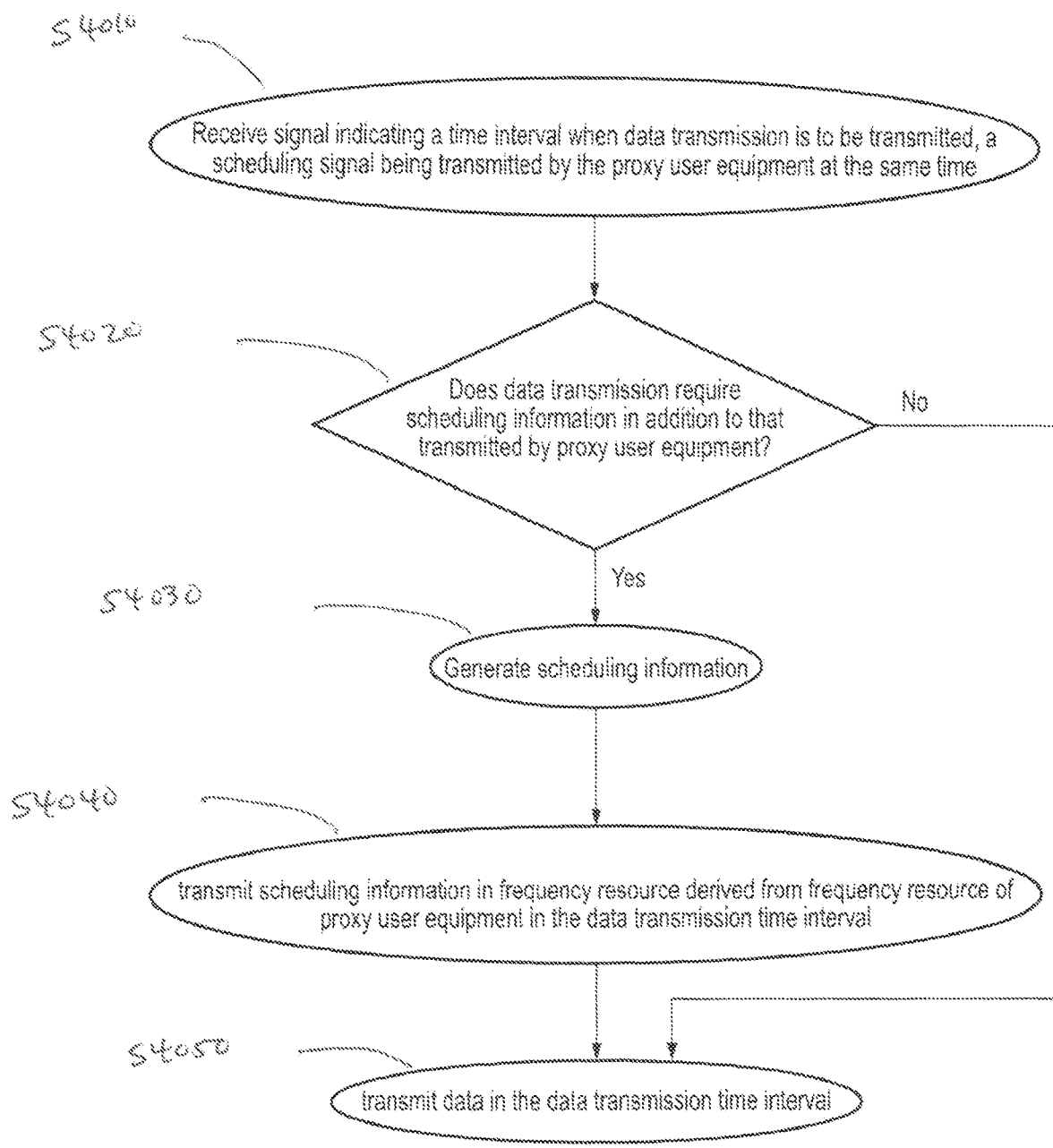
FIG. 4 schematically shows a method performed at a user equipment according to an embodiment that is not currently configured as a scheduling signal transmitting user equipment.

If the user equipment is not currently the proxy user equipment then it performs the steps of the method shown in FIG. 4 (S3060).

As shown in FIG. 4, the user equipment receives via higher layer signaling an indication of a time interval when it should transmit data (S4010). It determines whether further scheduling information is required for this transmission (S4020). If it is the further scheduling information is generated (S4030) and transmitted in a frequency resource that is derived from the frequency resource that the scheduling signal of the proxy user equipment is transmitted in (S4040). The further scheduling signal and the data are both transmitted in the data transmission time interval determined from the received higher layer signal (S4050).

If no further scheduling information is required, the data is transmitted in the data transmission time interval determined from the received higher layer signal.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of direct device to device communication performed at a user equipment, comprising:
   determining a time interval during which at least one other user equipment is to transmit a data transmission;
   generating a scheduling signal indicative of said data transmission; and transmitting said scheduling signal during said determined time interval.

2. The method according to claim 1, wherein said transmitting transmits said scheduling signal during a scheduling signal time interval, and said scheduling signal time interval is longer than said determined time interval.

3. The method according to claim 2, further comprising: transmitting a data transmission during a portion of said scheduling signal time interval.

4. The method according to claim 2, wherein said scheduling signal is indicative of a plurality of data transmissions from a plurality of user equipment, and said transmitting is performed at a same time as said plurality of user equipment are transmitting said plurality of data transmissions.

5. The method according to claim 1, wherein said determining comprises allocating time intervals for said at least one other user equipment to transmit said data transmission in, and transmitting an indication of said time intervals to said at least one other user equipment.

6. The method according to claim 1, wherein said scheduling signal comprises scheduling information indicative of at least one of: a modulation and/or coding scheme, a priority of said at least one other user equipment or a highest priority of multiple user equipment where said at least one other user equipment comprises multiple user equipment, a frequency resource of said at least one other user equipment, an aggregated frequency resource of said at least one other user equipment where said at least one other user equipment comprises multiple user equipment, a time gap between retransmission of said data transmission, a duration of said data transmission, presence of further scheduling information transmitted by said at least one other user equipment at a same time as said data transmission and a location within a scheduling signal time interval of said data transmission of said at least one other user equipment.

7. The method according to claim 6, wherein said scheduling signal comprises information indicative of said presence of said further scheduling information and an indication that said further scheduling information comprises information overriding or complementing said scheduling information, said indication indicating which portion of said scheduling information are overridden or complemented by said further scheduling information.

8. The method according to claim 1, wherein said user equipment is configured to transmit scheduling signals related to data transmissions of said user equipment at a first power level and said transmitting transmits said scheduling signal with a power that is boosted compared to said first power level.

9. The method according to claim 1, wherein said user equipment is within a group of user equipment, said group comprising said user equipment and said at least one other user equipment, said transmitting comprising multicasting or broadcasting data to said user equipment within said group.

10. The method according to claim 9, wherein said group comprises a platoon and said user equipment comprises a user equipment at one end of said platoon, and said transmitting comprises transmitting said scheduling signal for data transmissions in a direction away from said user equipment for said at least one other user equipment in said platoon.

11. The method according to claim 1, further comprising:
determining that said user equipment is within a group of user equipment and that said user equipment is currently a schedule signal user equipment operable to transmit said scheduling signal for at least some data transmissions of said group.

12. The method according to claim 11, further comprising:
determining whether said user equipment is no longer said schedule signal user equipment; and
transmitting said data transmission during a transmit time interval in which a further user equipment is transmitting said scheduling signal in response to determining that said user equipment is no longer said schedule signal user equipment.

13. A non-transitory computer-readable medium storing a computer program, which when executed by a computer, configures said computer to perform the method according to claim 1.

14. A user equipment, configured to perform device to device communication, said user equipment comprising:
at least one processor configured to,
determine a time interval during which at least one other user equipment is to transmit a data transmission;
generate a scheduling signal indicative of said data transmission; and
transmit said scheduling signal during said determined time interval.

* * * * *